United States Patent [19]

Hooper

[11] Patent Number: 4,626,106

[45] Date of Patent: Dec. 2, 1986

[54] VCR TIMED CONTROLLER

[75] Inventor: Gerald L. Hooper, Pinehurst, Id.

[73] Assignee: James Ratliff, Hayden Lake, Id.

[21] Appl. No.: 790,345

[22] Filed: Oct. 23, 1985

[51] Int. Cl.⁴ .............................................. G04F 8/00
[52] U.S. Cl. .................................... 368/107; 368/108; 369/19
[58] Field of Search .......................... 368/10, 107–110; 369/19, 20

[56] References Cited

U.S. PATENT DOCUMENTS 4,193,120  3/1980  Yello .................................... 369/19

Primary Examiner—Bernard Roskoski
Attorney, Agent, or Firm—Seed and Berry

[57] ABSTRACT

A timed controller operable with a VCR for partially inhibiting operation thereof after a preselected time period has elapsed. The controller includes a clock, and a counter receiving and counting clock pulses from the clock and generating an inhibit signal upon counting a predetermined number of clock pulses corresponding to the preselected time period. A keyed switch is used to reset the counter and to control a power switch to apply power to the clock and counter. A rechargeable battery supplies power to the clock and counter for operation of the controller when the VCR is disconnected from its source of power. An interconnect cable extends between the counter and the inhibit switch, and the inhibit switch is changed into a state which disables the VCR should the cable be disconnected. An inhibit switch is positioned within the VCR to apply a control signal thereto in response to the inhibit signal to cause the VCR to automatically rewind and disable other playing functions of the VCR.

22 Claims, 2 Drawing Figures

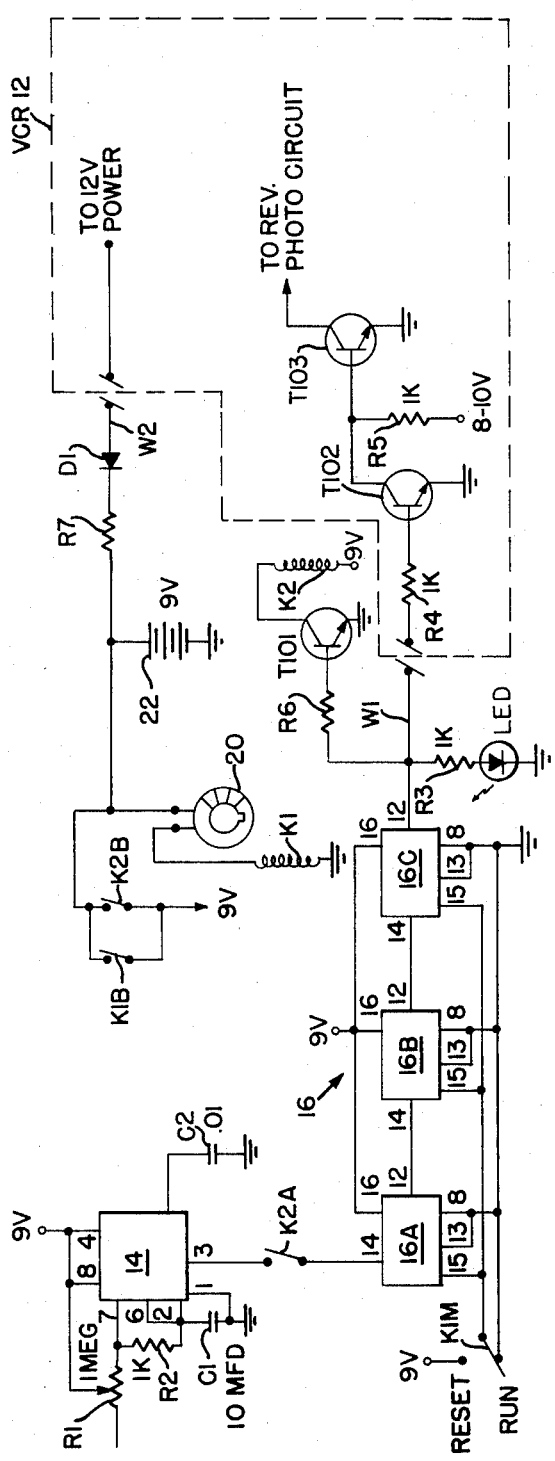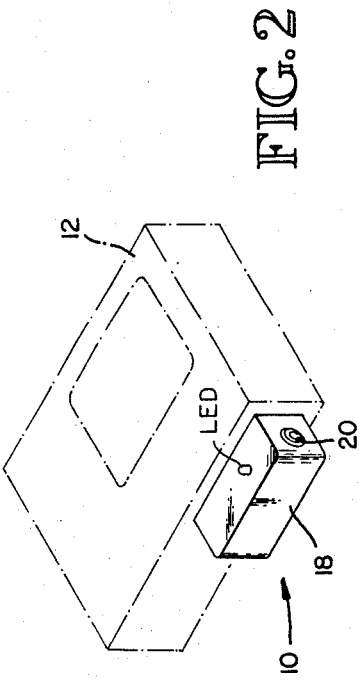

VCR TIMED CONTROLLER

DESCRIPTION

1. TECHNICAL FIELD

The present invention relates generally to video cassette players and recorders, and more particularly, to a timed controller therefor.

2. BACKGROUND ART

While the video cassette player and recorder has become a commonplace piece of electronic equipment in many home entertainment centers, a significant number of people still do not own their own and when they desire to view a cassette, either owned or rented, or desire to record a cassette, they must rent the video cassette player/recorder. An industry has developed to supply the rental needs of the public, but it has been plagued with the renting public not returning the equipment on time, or worse yet, never returning it. Thievery of rented equipment results in a significant loss to the equipment rental industry.

It will therefore be appreciated that there is a significant need for a timed controller operable with a video cassette recorder/player to encourage return of rented equipment when the rental time has elapsed and to discourage theft of the rented equipment. With respect to theft, even though the timed controller might be circumvented by a person having sufficient electronic skills who spends sufficient time to analyze the controller and its operation and make modifications thereto, requiring a thief to seek the help of such an expert and the time and associated expense involved in the study and modification in order to render the stolen equipment operable, significantly reduces its value. It is well recognized that reducing the value of stolen equipment to the person stealing it discourages future theft in that the risk involved is no longer worth the returns received. It is noted that a stolen video cassette player/recorder with a timed controller which inhibits its operation is virtually unsalable even as stolen property unless it is modified so as to be operational.

While a simple timer connected to the video cassette player/recorder in a manner which cuts power to all functions of the equipment upon the rental time elapsing would be partially effective, this provides the undesirable result that a renter using the equipment could have one of his own cassettes locked in the machine when it is disabled. This may cause him to damage the machine in an attempt to get it out.

Any timed controller should not be easily circumvented simply by the cutting of the wires interconnecting it with the video cassette player/recorder, or by crossing those wires. A person untrained in the electronics art should not be unable to circumvent the controller.

The present invention fulfills the need for such a timed controller, while avoiding the disadvantages mentioned, and further provides other related advantages.

DISCLOSURE OF THE INVENTION

A timed controller operable with a VCR for partially inhibiting the operation thereof after a preselected time period has elapsed. The controller includes a clock generating clock pulses at a preselected rate, a counter receiving and counting the clock pulses and generating an inhibit signal upon counting a predetermined number of the clock pulses corresponding to the predetermined time period, and an inhibit switch connected to the VCR for applying a controlled signal thereto in response to the inhibit signal to cause the VCR to automatically rewind and allow ejection of the cassette therein while disabling the other playing functions of the VCR upon elapse of the preselected time period. The controller further includes a keyed switch activated by a key removable from the VCR, a reset responsive to the keyed switch to reset the counters, and a power switch responsive to the keyed switch to apply power to the clock and counter. The power switch removes power from the clock and counter in response to the inhibit signal to disable the clock and counter upon the elapse of the preselected time period.

The controller further includes a battery supplying the power to the clock and counter through the power switch, whereby the clock and counter operate even when the VCR is not connected to its source of power as during transport and periods of nonuse when unplugged. The battery is rechargeable, and the controller further includes a charger powered by the VCR for recharging the battery. Means are included for supplying power for the clock and counter independent of the battery from a power line of the VCR when the VCR is plugged into its source of power.

The controller is connected to the VCR by first and second interconnect conductors. The first interconnect conductor conducts power to the charger and the second interconnect conductor conducts the inhibit signal to the inhibit switch within the VCR. The power for the inhibit switch is supplied from the VCR. The inhibit switch is rendered inoperative and maintains the control signal to the reverse photo circuit of the VCR to hold the VCR disabled in the event the first and second conductors are connected together or severed. As such, any attempt to circumvent the controller by crossing or severing the two conductors interconnecting the controller and the VCR will not render the VCR operative.

The inhibit switch includes first and second transistors responsive to the inhibit signal. The counter has a two logic state output signal, and the output signal is supplied to the first transistor of the inhibit switch.

The keyed switch has first and second positions controlling the operation of the controller. The power switch includes latching and nonlatching switching elements for controlling applications of power to the controller. An indicator light is provided which illuminates when the counter is counting.

Other features and advantages will become apparent from the following detailed description, taken in conjunction with the accompanying drawings.

DESCRIPTION OF THE DRAWINGS

FIG. 1 is a schematic diagram of the time controller of the present invention.

FIG. 2 is a perspective view of a case containing the time controller of the present invention mounted to the rear of a video cassette player and recorder shown in phantom line.

BEST MODE FOR CARRYING OUT THE INVENTION

As shown in the drawings for purposes of illustration, the present invention is embodied in a timed controller, indicated generally by reference numeral 10. The time controller 10 is shown in FIG. 2 fixedly attached to the rear of a video cassette player and recorder 12. The term "VCR" shall be used herein to include a unit having the combined capabilities for playing and recording, and also units having the ability to only play or record.

A schematic of the circuitry for the timed controller 10 is shown in FIG. 1 and includes a clock 14 which is a conventional "555" integrated circuit manufactured by RCA. The clock has an external potentiometer R1 and capacitor C1 connected thereto to set the pulse rate of the clock. The output of the clock 14 is connected through the normally opened contacts K2A of a relay having a solenoid coil K2, to the input of the first stage 16A of a three-stage counter 16. The first stage 16A as well as the second and third stages 16B and 16C, respectively, are up-decade counters. Conventional "4017" up-decade counter integrated circuits manufactured by RCA re used.

The first stage 16A sends a pulse to the input of the second stage counter 16B upon counting ten of the clock pulses produced by the clock 14 when the contact K2A is closed for operation of the controller 10. The operation of the relay will be described in more detail below. If the values of the potentiometer R1 and the capacitor C1 are set to produce a clock pulse every 4.5 minutes, a pulse is produced at the output of the first-stage counter 16A each 45 minutes. Similarly, the output of the first-stage counter 16A is connected to the input of the second stage counter 16B, and a pulse is produced at the output of the second-stage counter every 450 minutes (i.e. 7.5 hours). The output of the second stage counter 16B is connected to the input of the third-stage counter 16C, and a pulse is produced at the output of the third-stage counter at an elapsed time of 4,500 minutes (i.e. 75 hours). This is the normal time period for a rental, but the exact time period can be altered as needed for the situation by varying the clock rate selected through adjustment of the values of the resistor R1 and the capacitor C1, or by altering the counter 16 to produce the desired time period.

The output of the third-stage counter 16C is normally a plus five volts during the period of time when clock pulses are being counted, and upon reaching the full count for the counter 16, the output goes low to approximately zero volts. This corresponds to the rental time period elapsing for the VCR to which the controller 10 is attached. The output of the third-stage counter 16C is connected through a resistor R3 to the anode of a light-emitting diode (LED) having its cathode connected to ground. With the output of the third-stage counter 16C high, which is the situation during the period of time the counter 16 is counting up to the preselected rental time period for the timed controller 10, the LED is illuminated indicating that the controller is operable and that the controller is in a mode permitting full operation of the VCR 12 to which it is attached.

The output of the third-stage counter 16C is also connected through resistor R4 to the base of an NPN transistor T102 to provide base drive thereto when the counter 16 is counting. The emitter of the transistor T102 is connected to ground, and the collector of the transistor is connected to the base of a second NPN transistor T103 and also through a resistor R5 to a supply voltage. The emitter of the transistor T103 is connected to ground, and the collector of the transistor is connected to a reverse photo circuit (not shown) of the VCR 12.

The clock 14 and the counter 16, and the related circuitry, are contained within a protective box 18 fixedly attached to the rear of the VCR 12 in a manner which makes its removal difficult. Bolts may be used which are accessible only upon removal of the VCR case. The transistors T102 and 103 and the resistors R4 and R5, unlike the rest of the circuitry for the timed controller 10, are positioned within the case of the VCR 12. Preferably they are located on a circuit board in the VCR 12 in a manner which makes it difficult to detect that they are a part of the circuitry of the controller 10 and hence further complicates the task of analyzing and modifying the timed controller 10 necessary to render a stolen VCR operable.

The output of the third-stage counter 16C is connected to the resistor R4 through an interconnect wire W1 extending between the box 18 for the controller 10 and the interior of the case of the VCR 12. As will be described in more detail below, this is to prevent someone from merely removing the box 18 for the controller 10 from the VCR 12 and disconnecting or crossing the interconnecting wires to circumvent the controller.

When the output of the third-stage counter 16C is high during counting of pulses, it provides drive to the base of the transistor T102, holding the base of the transistor T103 at a sufficiently low voltage level to place it in a non-conducting state. Upon the counter 16 counting a sufficient number of the clock pulses form the clock 14 to indicate that the preselected rental time period has elapsed, which produces a low voltage on the output of the third-stage counter 16C, drive to the base of the transistor T102 is eliminated. This allows the base drive to be provided to the transistor T103 through the resistor R5, and places the transistor in a conducting state. When the transistor T103 is conducting, the voltage on the collector of the transistor T103 is pulled down substantially ground, and a ground is placed on the line to the reverse photo circuit of the VCR 12. A ground on the reverse photo circuit of VCRs of the type with which the controller 10 is presently designed to operate causes the VCR 12 to automatically rewind and eject the cassette therein. At the same time all other playing functions of the VCR, such as play, fast forward, pause, et cetera are disabled. In such manner, if a user's cassette is in the VCR when the rental period has elapsed, it will not be trapped therein but will be rewound and ejected, and the VCR rendered inoperable for further play or other operation until the controller 10 is reset.

It is noted that if the interconnect wire W1 between the output of the third-stage counter 16C and the resistor R4 positioned within the case of the VCR 12 is cut, the base of the transistor T102 is free-floating and the transistor remains in a non-conductive state, which holds the transistor T103 in a conducting state. As such, the transistor T103 continues to prevent operation of the VCR 12.

The activation of the controller 10 is accomplished using a circular security key switch 20 of a conventional type used for home security alarms. The key switch 20 has two contacts which are normally open when an appropriate key is inserted and maintained in a first position. The contacts are closed when the key is turned to a second position. The one contact of the key switch 20 is connected to ground through a solenoid coil K1 of another relay. The other terminal of the key switch 20 is connected to the positive terminal of a nine-volt, nickel-cadmium, rechargeable battery 22 positioned within the case 18 of the controller 10. The other terminal of the key switch 20 is connected through a resistor R7 to the cathode of a diode D1. The anode of the diode D1 is connected to a 12 volt internal power line of the VCR 12 through an interconnect wire W2 extending between the box 18 for the controller 10 and the interior of the case of the VCR.

The internal power of the VCR 12 provides power for the controller circuit during normal operation when the VCR is connected to its own power supply, and also serves to recharge the battery 22 to replace any charge loss due to operation of the controller 10 off the battery. It is noted that when the VCR 12 is connected to its own power supply, as it must be for operation of the VCR, the VCR supplies the current necessary to operate the transistors T102 and T103. As such, even if the battery 22 is removed or the interconnect wire W1 disconnected to remove power to the controller 10 in an attempt to circumvent it, the transistors T102 and T103 will continue to operate and be powered by the VCR thus preventing operation of the VCR.

When the VCR 12 is unplugged from its power source, such as during transport or periods of nonuse, the battery 22 provides the necessary power to the controller 10 to keep it functioning so as not to disrupt the clock 14 or the counter 16. By supplying an independent power source such as the battery 22, the controller 10 may commence running when the counter 16 is reset at the rental store and continue running during any periods of time when the VCR is unplugged.

When the key is inserted into the key switch 20 and it is turned from the first position to the second position to produce closure of the contacts of the key switch, power is supplied to the relay coil K1 to energize it. Energizing the coil K1 causes closure of the normally opened contacts of a single-pole, single-throw relay switch K1B of the first relay which connects the positive terminal of the battery 22 and the resistor R7 which is connected to the internal power line of the VCR 12, to the positive power supply supply line of the controller 10. This provides initial power to the clock 14 and the counter 16. Energizing of the relay coil K1 also causes a single-pole, double-throw switch K1M of the first relay to move from a "RUN" position connecting the reset lines of each of the three stage counters 16A, 16B and 16C to ground which permits the counter to run to a "RESET" position connecting the reset lines to the positive power supply line of the controller 10 (+9. v.) which causes each of the three-stage counters to reset to zero for initializing the counter.

If the key was left in its second position with the contacts of the key switch 20 in closed position, power would be supped to the controller 10 through the switch K1B and the switch K1M would remain in the REST position, thus the output of the third-stage counter 16C would be held in the high state even though the clock 14 was running. This allows the VCR 12 to remain operative beyond the normal rental time period and for as long as the key is maintained in this second position. Preferably, the key switch 20 permits the key to be removed from the key switch while in this second position to maintain the contacts of the key switch closed, thus avoiding the need to supply a key with the VCR being rented. This allows flexibility for those situations in this it is desired to rent the VCR 12 to trusted customers for long periods of time beyond the normal maximum rental time period for which the controller 10 is set. It is noted that in other contemplated embodiments of the invention, the key may have a third or other additional positions to select the desired rental timer period for the controller.

When the counter 16 is reset and the output of the third-stage counter 16C is high, it drives the base of a transistor T101 through a resistor R6. The emitter of the transistor T101 is connected to ground, and the collector is connected to the positive power supply line through a solenoid coil K2 of a second relay. Immediately upon resetting of the counter 16, the transistor T101 begins to conduct and the coil K2 is energized. This causes closure of the normally opened contacts of a single-pole, single-throw switch K2A of the second relay which connects the output of the clock 14 to the input of the first-stage counter 16A. The energizing of the coil K2 also causes closure of the normally open contacts of a single-pole, single-throw switch K2B.

The switch K2B is in parallel with the switch K1B of the first relay and also connects the positive terminal of the battery 22 and the resistor R7 which is connected to the internal power line of the VCR 12, to the positive power supply line of the controller 10. As such, power is initially supplied to the power supply line by the action of the first relay through the switch K1B, and when the counter 16 is reset, the second relay is latched in and power is supplied through the switch K2B. Since the second relay stays latched for as long as the output of the third-state counter 16C stays high, power will be supplied to the controller even through the key of the key switch 20 is returned to the first position which causes the contacts of the key switch to open and the coil K1 to be de-energized. The output of the third-stage counter 16C will remain high, and hence the coil K2 will remain energized by the transistor T101 until the rental time period has elapsed.

De-energizing the coil K1 causes the switches K1B and K1M to return to their normal open and RUN positions, respectively. When the switch K1M is moved to the RUN position, the reset counter 16 is allowed to commence counting.

When the rental time period has elapsed, the output of the third-stage counter 16C will go low, disabling the VCR 12 as described above and eliminating base drive to the transistor T101. The lack of base drive to the transistor T101 de-energizes the coil K2, causing the switch K2B to return to its normally open condition disconnecting the all power from the positive power supply line of the controller 10. Since the switch K1B of the first relay will have already been returned to its normally open condition upon resetting of the counter 16, there will be no drain on the battery 22 during the period of time when the controller 10 is holding the VCR disabled. When the switch K2A returns to its normally open position, it also disconnects the clock 14 from the first-state counter 16A to avoid any clock pulses from the clock passing through to the counter 16 and being counted until the counter is reset again by energizing of the coil K1.

It is noted that if a person attempts to circumvent the controller 10 by removing the box 18 from the VCR 12 and cutting the two innerconnecting wires W1 and W2, the VCR remains disabled, as described above. If the two interconnecting wires W1 and W2 are connected together, the full 12-volts on the interconnecting wire W2 will be placed on the base of the transistor T102, through the resistor R4, and will damage the transistor and place it in a non-conducting state. As such, the transistor T103 will continue operating in a conducting state and the VCR 12 will be maintained inoperative.

In the preferred embodiment of the invention, a ten-wire ribbon is used to innerconnect the circuitry of the controller 10 in the box 18 with the interior of the case of the VCR 12, even through only two wires of the ribbon cable are utilized. The other eight wires may be connected in a matter which does not affect the operation of either the controller or the VCR, but yet misleads a thief as to the operation of the controller.

With the present invention, users of the rented VCR 12 will have no incentive to keep the VCR beyond the rented time period since the controller 10 will prevent its use beyond that period, and those who would otherwise desire to steal the rented VCR are discouraged from doing so by the presence of the box 18 of the controller 10. Even if the box is removed, which in itself takes a certain amount of effort, a person untrained in the electronics arts will be unable to readily circumvent the controller merely by clipping wires or connecting them together. Even those trained in the art will require some time to determine what changes in the circuitry are required. Any such delay or difficulty reduces the effective value of the VCR to a thief, rendering the VCR of such a low value that the chance of apprehension for the theft is not worth the value to be gained from the theft.

It will be appreciated that, although a specific embodiment of the invention has been described herein for purposes of illustration, various modifications may be made without departing from the spirit and scope of the invention. Accordingly, the invention is not limited except by the amended claims.

I claim:

1. A timed controller operable with a VCR for partially inhibiting operation thereof after a preselected time period has elapsed, comprising:
   a clock generating clock pulses at a preselected rate;
   a counter receiving and counting said clock pulses and generating an inhibit signal upon counting a predetermined number of said clock pulses corresponding to the preselected time period;
   an inhibit switch connected to the VCR and applying a control signal thereto in response to said inhibit signal to cause the VCR to automatically rewind and allow ejection of a cassette therein while disabling other playing functions of the VCR upon elapse of the preselected time period;
   a keyed switch activated by a key removable from the VCR; and
   a reset responsive to said keyed switch to reset said counter.

2. A timed controller operable with a VCR for partially inhibiting operation thereof after a preselected time period has elapsed, comprising:
   a clock generating clock pulses at a preselected rate;
   a counter receiving and counting said clock pulses and generating an inhibit signal upon counting a predetermined number of said clock pulses corresponding to the preselected time period;
   an inhibit switch connected to the VCR and applying a control signal thereto in response to said inhibit signal to cause the VCR to automatically rewind and allow ejection of a cassette therein while disabling other playing functions of the VCR upon elapse of the preselected time period;
   a keyed switch activated by a key removable from the VCR;
   a reset responsive to said keyed switch to reset said counter; and
   a power switch responsive to said keyed switch to apply power to said clock and said counter.

3. The controller of claim 2 wherein said power switch removes power from said clock and said counter in response to said inhibit signal to disable said clock and said counter upon elapse of the preselected time period.

4. The controller of claim 2, further including a battery supplying the power to said clock and said counter through said power switch, whereby said clock and counter operate even when the VCR is not plugged into its source of power as during transport and periods of nonuse when unplugged.

5. The controller of claim 4, wherein said battery is rechargeable, and the controller further includes a charger powered by the VCR for recharging said battery.

6. The controller of claim 4, wherein said inhibit switch is positioned within the VCR and the power for said inhibit switch is supplied from the VCR.

7. The controller of claim 1 further including a battery supplying current to said clock and said counter, and means for supplying power for said clock and said counter independent of said battery from a power line of the VCR when the VCR is plugged into its source of power.

8. A timed controller operable with a VCR for partially inhibiting operation thereof after a preselected time period has elapsed, comprising:
   a clock generating clock pulses at a preselected rate;
   a counter receiving and counting said clock pulses and generating an inhibit signal upon counting a predetermined number of said clock pulses corresponding to the preselected time period;
   an inhibit switch connected to the VCR and applying a control signal thereto in response to said inhibit signal to cause the VCR to automatically rewind and allow ejection of a cassette therein while disabling other playing functions of the VCR upon elapse of the preselected time period;
   a rechargeable battery supplying current to said clock and said counter;
   means for supplying power for said clock and said counter independent of said battery from a power line of the VCR when the VCR is plugged into its source of power; and
   a charger powered by the VCR for recharging said battery, the controller being connectable to the VCR by first and second interconnect conductors, said first interconnect conductor conducting power to said charger and said second interconnect conductor conducting said inhibit signal to said inhibit switch within the VCR, said inhibit switch being rendered inoperative and maintaining said control signal to the reverse photo circuit of the VCR to hold the VCR disabled in the event said first and second conductors are connected together or severed, whereby any attempt to circumvent the controller by crossing or severing the two conductors interconnecting the controller and the VCR will not render the VCR operative.

9. A timed controller operable with a VCR for partially inhibiting operation thereof after a preselected time period has elapsed, comprising:
   a clock generating clock pulses at a preselected rate;
   a counter receiving and counting said clock pulses and generating an inhibit signal upon counting a predetermined number of said lock pulses corresponding to the preselected time period;

an inhibit switch connected to the VCR and applying a control signal thereto in response to said inhibit signal to cause the VCR to automatically rewind and allow ejection of a cassette therein while disabling other playing functions of the VCR upon elapse of the preselected time period, said inhibit switch including first and second transistors responsive to said inhibit signal, said first transistor being held in a first of one or the other of a conducting state or a nonconducting state during the preselected time period and switched into the opposite state by said inhibit signal, and said second transistor being held in a first of one or the other of a conducting state or a nonconducting state during the preselected time period and switch into the opposite state in response to said first transistor being switched into a an opposite state, said second transistor generating said control signal to the VCR by applying a ground voltage potential to the reverse photo circuit of the VCR when in its opposite state.

10. The controller of claim 9 wherein said counter has a two-logic state output signal, with a first logic state indicating said predetermined number of clock pulses has not been counted and a second logic state indicating said predetermined number of clock pulses has been counted, said counter output signal being connected to said first transistor, said first logic state maintaining said first transistor in its said first state and said second logic state maintaining said first transistor in said opposite state.

11. The controller of claim 10 wherein said counter is connected to the base of said first transistor to supply said output signal thereto, and said first transistor is connected to the base of said second transistor to permit a drive thereto responsive to said first transistor being switched to said first state by said output signal.

12. The controller of claim 11 wherein the collector of said second transistor is connected to the reverse photo circuit of the VCR to supply a ground voltage potential thereto when said second transistor is switched into its opposite state.

13. The controller of claim 2 wherein said keyed switch has first and second positions, said first key position causing said reset to reset said counter and said power switch to apply power to said clock and said counter, and said second key position permitting said counter to count.

14. The controller of claim 13 wherein said power switch includes first and second switching elements, said first switching element being a non-latching device applying initial power to said clock and said counter only when said keyed switch is in said first key position, and said second switching element being a latching device actuated by resetting of said counter and applying power to said clock and said counter even after said keyed switch is moved to said second key position, said second switching element de-latching in response to said inhibit signal to remove power from said clock and said counter.

15. The controller of claim 14 wherein said reset and said first switching element is activated by a first relay coil energized when said keyed switch is moved into said first key position and de-energized when said keyed switch is moved into said second key position.

16. The controller of claim 15 wherein said second switching element is activated by a second relay coil energized when said counter is reset and de-energized by said inhibit signal.

17. The controller of claim 16 wherein said second relay coil controls a clock switch to hold said clock disconnected from said counter until said counter is reset and to again disconnect said clock from said counter in response to said inhibit signal.

18. The controller of claim 1 further including an indicator light which illuminates while said counter is counting said predetermined number of said clock pulses to indicate operativeness of the controller, and is turned off upon elapse of the preselected time period.

19. The controller of claim 1 wherein said inhibit switch is positionable within the VCR and an interconnect conductor extends between said counter and said inhibit switch, said inhibit switch latching into a state which continuously applies said control signal to the VCR upon disconnection of said interconnect conductor.

20. A timed controller operable with a VCR for partially inhibiting operation thereof after a preselected time period has elapsed, comprising:
a clock generating clock pulses at a preselected rate;
a counter receiving and counting said clock pulses and generating an inhibit signal upon counting a predetermined number of said clock pulses corresponding to the preselected time period;
an inhibit switch connectable to the VCR and applying a control signal thereto in response to said inhibit signal to cause the VCR to automatically rewind and to disable other playing functions of the VCR, said inhibit switch being positionable within the VCR and the power for said inhibit switch being supplied by the VCR;
a keyed switch activated by a key removable from the VCR;
a reset responsive to said keyed switch to reset said counter;
a power switch responsive to said keyed switch to apply power to said clock and said counter;
a battery supplying power to said clock and said counter through said power switch for operation of the controller when the VCR is disconnected from its source of power; and
an interconnect conductor extending between said counter and said inhibit switch, said inhibit switch latching into a state which continuously applies said control signal to the VCR upon disconnection of said interconnect conductor.

21. The controller of claim 20, wherein said battery is rechargeable and further including a charger powered by the VCR for recharging said battery, said charger being connected to the VCR by another interconnect conductor, said inhibit switch being rendered inoperative and maintaining said control signal to the VCR to hold the VCR disabled in the event said interconnect conductors are connected together.

22. A timed controller operable with a VCR for partially inhibiting operation thereof after a preselected time period has elapsed, comprising:
clock means for generating clock pulses at a preselected rate;
counter means for receiving and counting said clock pulses and generating an inhibit signal upon counting a predetermined number of said clock pulses corresponding to the preselected time period;
inhibit switch means connectable to the VCR for applying a control signal thereto in response to said inhibit signal to cause the VCR to automatically rewind and to disable other playing functions of the VCR, said inhibit switch means being positionable within the VCR and the power for said inhibit switch means being supplied by the VCR:

keyed switch means activated by a key removable from the VCR;

reset means responsive to said keyed switch means for resetting said counter means;

a battery supplying power to said clock means and said counter means; and an interconnect conductor extending between said counter means and said inhibit switch means, said inhibit switch means latching into a state which continuously applies said control signal to the VCR upon disconnection of said interconnect conductor.

* * * * *